US011899110B2

(12) United States Patent
Allen et al.

(10) Patent No.: US 11,899,110 B2
(45) Date of Patent: *Feb. 13, 2024

(54) TECHNIQUES FOR DETECTING CROSS-TALK INTERFERENCES IN LIDAR IMAGING SENSORS

(71) Applicant: Cepton Technologies, Inc., San Jose, CA (US)

(72) Inventors: Jon Day Allen, La Jolla, CA (US); Dongyi Liao, Mountain View, CA (US); Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/471,732

(22) Filed: Sep. 10, 2021

(65) Prior Publication Data

US 2021/0405190 A1    Dec. 30, 2021

Related U.S. Application Data

(62) Division of application No. 17/032,526, filed on Sep. 25, 2020, now Pat. No. 11,150,348.

(Continued)

(51) Int. Cl.
*G01S 17/10* (2020.01)
*G01S 17/894* (2020.01)
*G01S 7/487* (2006.01)

(52) U.S. Cl.
CPC .............. *G01S 17/10* (2013.01); *G01S 7/487* (2013.01); *G01S 17/894* (2020.01)

(58) Field of Classification Search
None
See application file for complete search history.

(56) References Cited

U.S. PATENT DOCUMENTS 10,613,203 B1    4/2020    Rekow et al.
10,641,876 B2    5/2020    Field
(Continued)

FOREIGN PATENT DOCUMENTS

CN    108603932 A    9/2018
CN    109416399 A    3/2019
(Continued)

OTHER PUBLICATIONS

PCT/US2020/053021, "International Preliminary Report on Patentability", dated Apr. 5, 2022, 14 pages.
(Continued)

*Primary Examiner* — Luke D Ratcliffe
(74) *Attorney, Agent, or Firm* — Kilpatrick Townsend & Stockton LLP

(57) ABSTRACT

A LiDAR system includes one or more light sources configured to emit a set of light pulses in a temporal sequence with randomized temporal spacings between adjacent light pulses, one or more detectors configured to receive a set of return light pulses, and a processor configured to: determine a time of flight for each return light pulse of the set of return light pulses; and obtain a point cloud based on the times of flight of the set of return light pulses. Each point corresponds to a respective return light pulse. The processor is further configured to, for each respective point of the set of points in the point cloud: analyze spatial and temporal relationships between the respective point and a set of neighboring points in the set of points; and evaluate a quality factor for the respective point based on the spatial and temporal relationships.

20 Claims, 14 Drawing Sheets

Related U.S. Application Data

(60) Provisional application No. 62/909,633, filed on Oct. 2, 2019.

(56) References Cited

U.S. PATENT DOCUMENTS

| | | |
|---|---|---|
| 11,150,348 B2 | 10/2021 | Allen et al. |
| 2007/0040121 A1 | 2/2007 | Kalayeh |
| 2016/0003946 A1* | 1/2016 | Gilliland ............... G01S 17/894 |
| | | 356/5.01 |
| 2016/0178802 A1 | 6/2016 | Stainvas Olshansky et al. |
| 2017/0307759 A1 | 10/2017 | Pei et al. |
| 2018/0100928 A1* | 4/2018 | Keilaf ................... G01S 17/931 |
| 2018/0136321 A1 | 5/2018 | Verghese et al. |
| 2018/0196125 A1 | 7/2018 | Irish |
| 2018/0267152 A1 | 9/2018 | McMichael et al. |
| 2018/0292534 A1 | 10/2018 | Field |
| 2018/0373253 A1* | 12/2018 | Lipson .................. G01S 7/4815 |
| 2019/0004177 A1 | 1/2019 | Shand |
| 2019/0051172 A1 | 2/2019 | Stenneth et al. |
| 2019/0094364 A1 | 3/2019 | Fine et al. |
| 2019/0120940 A1 | 4/2019 | Pei et al. |
| 2020/0064452 A1 | 2/2020 | Avlas et al. |
| 2020/0142033 A1 | 5/2020 | Shand |
| 2020/0158825 A1 | 5/2020 | Meissner et al. |

FOREIGN PATENT DOCUMENTS

| | | |
|---|---|---|
| CN | 110121658 A | 8/2019 |
| WO | 2018/055513 A2 | 3/2018 |

OTHER PUBLICATIONS

Notice of Allowance dated Jun. 28, 2021 in related U.S. Appl. No. 17/032,526 (five pages).
Chinese First Office Action dated Dec. 5, 2022 in related Chinese Application No. 2020800697974 (eight pages).
PCT/US2020/053021, "International Search Report", dated Dec. 30, 2020, two pages.
PCT/US2020/053021, "Written Opinion of the International Searching Authority", dated Dec. 30, 2020, thirteen pages.
Non-Final Office Action dated Mar. 11, 2021 in related U.S. Appl. No. 17/032,526, filed Sep. 25, 2020 (thirteen pages).
Non-Final Office Action dated Nov. 6, 2023 in related U.S. Appl. No. 17/471,781.

* cited by examiner

TECHNIQUES FOR DETECTING CROSS-TALK INTERFERENCES IN LIDAR IMAGING SENSORS

CROSS-REFERENCES TO RELATED APPLICATIONS

This application is a divisional of U.S. application Ser. No. 17/032,526, filed Sep. 25, 2020, which claims the benefit of U.S. Provisional Patent Application No. 62/909,633, filed on Oct. 2, 2019, the contents of which are incorporated by reference in their entireties.

BACKGROUND OF THE INVENTION

Three-dimensional sensors can be applied in autonomous vehicles, drones, robotics, security applications, and the like. LiDAR sensors are one type of three-dimensional sensors that can achieve high angular resolutions appropriate for such applications. A LiDAR sensor can include one or more laser sources for emitting laser pulses, and one or more detectors for detecting reflected laser pulses. The LiDAR sensor measures the time it takes for each laser pulse to travel from the LiDAR sensor to an object within the sensor's field of view, then bounce off the object and return to the LiDAR sensor. Based on the time of flight of the laser pulse, the LiDAR sensor determines how far away the object is from the LiDAR sensor.

In cases in which two or more LiDAR sensors are operating in the vicinity of each other, it is possible that the operation of one LiDAR sensor may interfere with the operation of another LiDAR sensor. For instance, assume that a first LiDAR sensor emits a first laser pulse a short time (e.g., a few nanoseconds) before a second LiDAR sensor emits a second laser pulse. The first laser pulse can bounce off an object and be detected by the second LiDAR sensor. The second LiDAR sensor may determine a time of flight for the detected laser pulse that is shorter than the actual value for the second laser pulse. Thus, the second LiDAR sensor may erroneously report the object as being closer than it actually is. Therefore, there is a need for LiDAR systems and methods that can detect erroneous data points caused by cross-talk interferences.

SUMMARY OF THE INVENTION

According to some embodiments, a LiDAR system includes one or more light sources configured to emit a set of light pulses to be directed toward a scene within a field of view of the LiDAR system. The set of light pulses is emitted in a temporal sequence with randomized temporal spacings between adjacent light pulses. The LiDAR system further includes one or more detectors configured to receive a set of return light pulses. At least a subset of the set of return light pulses corresponds to the set of light pulses that have been reflected off of one or more objects in the scene. The LiDAR system further includes a processor coupled to the one or more light sources and the one or more detectors. The processor is configured to: determine a time of flight for each return light pulse of the set of return light pulses; and obtain a point cloud based on the times of flight of the set of return light pulses. The point cloud includes a set of points representing one or more surfaces of the one or more objects. Each point corresponds to a respective return light pulse of the set of return light pulses. The processor is further configured to, for each respective point of the set of points in the point cloud: analyze spatial and temporal relationships between the respective point and a set of neighboring points in the set of points; and evaluate a quality factor for the respective point based on the spatial and temporal relationships.

According to some embodiments, a method of operating a LiDAR system includes emitting, using one or more light sources, a set of light pulses in a temporal sequence with randomized temporal spacings between adjacent light pulses. The set of light pulses is directed toward a scene within a field of view of the LiDAR system. The method further includes detecting, using one or more detectors, a set of return light pulses. At least a subset of the set of return light pulses corresponds to the set of light pulses that have been reflected off of one or more objects in the scene. The method further includes determining a time of flight for each return light pulse of the set of return light pulses; and obtaining a point cloud based on the times of flight of the set of return light pulses. The point cloud includes a set of points representing one or more surfaces of the one or more objects. Each point corresponds to a respective return light pulse of the set of return light pulses. The method further includes, for each respective point of the set of points in the point cloud: analyzing spatial and temporal relationships between the respective point and a set of neighboring points in the set of points; and evaluating a quality factor for the respective point based on the spatial and temporal relationships.

According to some embodiments, a LiDAR system includes a plurality of light sources disposed as an array and configured to emit a plurality of sets of light pulses to be directed toward a scene within a field of view of the LiDAR system. Each respective set of light pulses comprises a plurality of light pulses in a temporal sequence. Each respective light pulse is emitted by a respective light source of the plurality of light sources. The plurality of sets of light pulses is temporally separated from each other by randomized time delays. The LiDAR system further includes a plurality of detectors disposed as an array. Each respective detector corresponds to a respective light source. The plurality of detectors is configured to detect a plurality of return light pulses. At least a subset of the plurality of return light pulses corresponds to the plurality of sets of light pulses that have been reflected off of one or more objects in the scene. The LiDAR system further includes a processor coupled to the plurality of light sources and the plurality of detectors. The processor is configured to: determine a time of flight for each respective return light pulse of the plurality of return light pulses; and obtain a point cloud based on the times of flight of the plurality of return light pulses. The point cloud includes a plurality of points representing one or more surfaces of the one or more objects. Each respective point corresponds to a respective return light pulse. The processor is further configured to, for each respective point in the point cloud: analyze spatial and temporal relationships between the respective point and neighboring points in the point cloud; and evaluate a quality factor for the respective point based on the spatial and temporal relationships.

According to some embodiments, a method of operating a LiDAR system includes, emitting, using a plurality of light sources disposed as an array, a plurality of sets of light pulses to be directed toward a scene within a field of view of the LiDAR system. Each respective set of light pulses comprises a plurality of light pulses in a temporal sequence. Each respective light pulse is emitted by a respective light source of the plurality of light sources. The plurality of sets of light pulses is temporally separated from each other by randomized time delays. The method further includes detecting, using a plurality of detectors disposed as an array, a plurality of return light pulses. Each respective detector corresponds to a respective light source. At least a subset of the plurality of return light pulses corresponds to the plurality of sets of light pulses that have been reflected off of one or more objects in the scene. The method further includes determining a time of flight for each respective return light pulse of the plurality of return light pulses; and obtaining a point cloud based on the times of flight of the plurality of return light pulses. The point cloud includes a plurality of points representing one or more surfaces of the one or more objects. Each respective point corresponds to a respective return light pulse. The method further includes, for each respective point in the point cloud: analyzing spatial and temporal relationships between the respective point and neighboring points in the point cloud; and evaluating a quality factor for the respective point based on the spatial and temporal relationships.

According to some embodiments, a LiDAR system includes a plurality of light sources disposed as an array and configured to emit a plurality of sets of light pulses to be directed toward a scene within a field of view of the LiDAR system. Each respective set of light pulses includes a plurality of light pulses in a temporal sequence. Each respective light pulse is emitted by a respective light source of the plurality of light sources. The plurality of light pulses is emitted by the plurality of light sources in a randomized order. The LiDAR system further includes a plurality of detectors disposed as an array. Each respective detector corresponds to a respective light source. The plurality of detectors is configured to detect a plurality of return light pulses. At least a subset of the plurality of return light pulses corresponds to the plurality of sets of light pulses that have been reflected off of one or more objects in the scene. The LiDAR system further includes a processor coupled to the plurality of light sources and the plurality of detectors. The processor is configured to: determine a time of flight for each respective return light pulse of the plurality of return light pulses; and obtain a point cloud based on the times of flight of the plurality of return light pulses. The point cloud includes a plurality of points representing one or more surfaces of the one or more objects. Each respective point corresponds to a respective return light pulse. The processor is further configured to, for each respective point in the point cloud: analyze spatial and temporal relationships between the respective point and neighboring points in the point cloud; and evaluate a quality factor for the respective point based on the spatial and temporal relationships.

According to some embodiments, a method of operating a LiDAR system includes emitting, using a plurality of light sources disposed as an array, a plurality of sets of light pulses to be directed toward a scene within a field of view of the LiDAR system. Each respective set of light pulses includes a plurality of light pulses in a temporal sequence. Each respective light pulse is emitted by a respective light source of the plurality of light sources. The plurality of light pulses is emitted by the plurality of light sources in a randomized order. The method further includes detecting, using a plurality of detectors disposed as an array, a plurality of return light pulses. Each respective detector corresponds to a respective light source. At least a subset of the plurality of return light pulses corresponds to the plurality of sets of light pulses that have been reflected off of one or more objects in the scene. The method further includes determining a time of flight for each respective return light pulse of the plurality of return light pulses; and obtaining a point cloud based on the times of flight of the plurality of return light pulses. The point cloud includes a plurality of points representing one or more surfaces of the one or more objects. Each respective point corresponds to a respective return light pulse. The method further includes, for each respective point in the point cloud: analyzing spatial and temporal relationships between the respective point and neighboring points in the point cloud; and evaluating a quality factor for the respective point based on the spatial and temporal relationships.

DETAILED DESCRIPTION OF SPECIFIC EMBODIMENTS

Embodiments of the present invention provide LiDAR systems and methods for detecting erroneous data points that may be caused by cross-talk interferences between LiDAR sensors. Merely by way of example, embodiments of the present invention provide techniques that employ randomized firing sequences for light sources in a LiDAR system, and evaluate a quality factor for any given point in a point cloud generated by the LiDAR system by analyzing the spatial and temporal relationships between the given point and its neighboring points in the point cloud. A perception software can determine whether to ignore certain points based at least partly on their quality factor values. In some embodiments, the perception software can take into account other factors (e.g., weather conditions), as well as other sensor data (e.g., camera data and radar data), in addition to the quality factor values.

Figure 1:
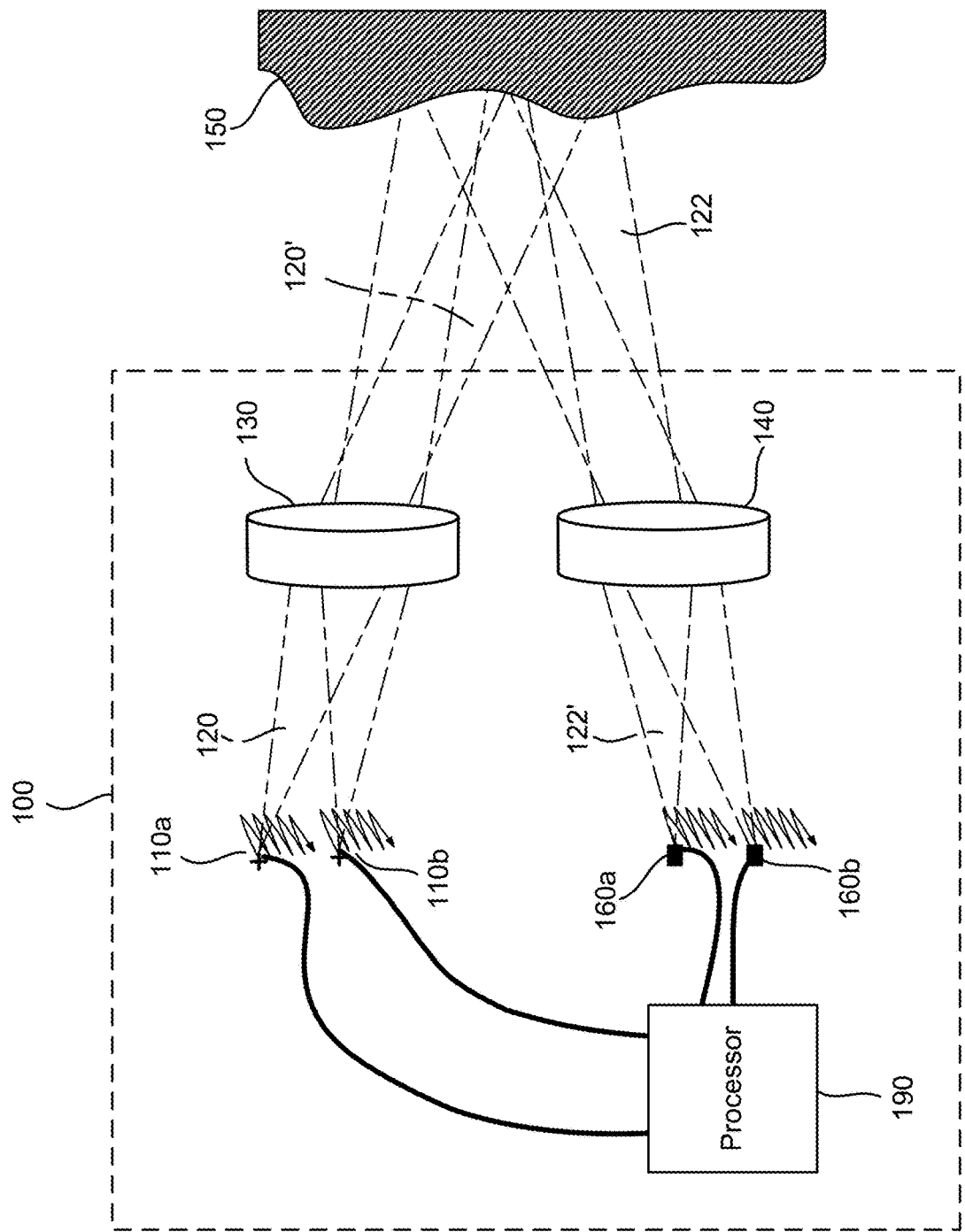
FIG. 1 illustrates an exemplary LiDAR sensor for three-dimensional imaging.

FIG. 1 illustrates an exemplary LiDAR sensor 100 for three-dimensional imaging according to some embodiments. The LiDAR sensor 100 includes an emission lens 130 and a receiving lens 140. The LiDAR sensor 100 includes a light source 110a disposed substantially in a back focal plane of the emission lens 130. The light source 110a is operative to emit a light pulse 120 from a respective emission location in the back focal plane of the emission lens 130. The emission lens 130 is configured to collimate and direct the light pulse 120 toward an object 150 located in front of the LiDAR sensor 100. For a given emission location of the light source 110a, the collimated light pulse 120' is directed at a corresponding angle toward the object 150.

A portion 122 of the collimated light pulse 120' is reflected off of the object 150 toward the receiving lens 140. The receiving lens 140 is configured to focus the portion 122' of the light pulse reflected off of the object 150 onto a corresponding detection location in the focal plane of the receiving lens 140. The LiDAR sensor 100 further includes a detector 160a disposed substantially at the focal plane of the receiving lens 140. The detector 160a is configured to receive and detect the portion 122' of the light pulse 120 reflected off of the object at the corresponding detection location. The corresponding detection location of the detector 160a is optically conjugate with the respective emission location of the light source 110a.

The light pulse 120 may be of a short duration, for example, 10 ns pulse width. The LiDAR sensor 100 further includes a processor 190 coupled to the light source 110a and the detector 160a. The processor 190 is configured to determine a time of flight (TOF) of the light pulse 120 from emission to detection. Since the light pulse 120 travels at the speed of light, a distance between the LiDAR sensor 100 and the object 150 may be determined based on the determined time of flight.

One way of scanning the laser beam 120' across a FOV is to move the light source 110a laterally relative to the emission lens 130 in the back focal plane of the emission lens 130. For example, the light source 110a may be raster scanned to a plurality of emission locations in the back focal plane of the emission lens 130 as illustrated in FIG. 1. The light source 110a may emit a plurality of light pulses at the plurality of emission locations. Each light pulse emitted at a respective emission location is collimated by the emission lens 130 and directed at a respective angle toward the object 150, and impinges at a corresponding point on the surface of the object 150. Thus, as the light source 110a is raster scanned within a certain area in the back focal plane of the emission lens 130, a corresponding object area on the object 150 is scanned. The detector 160a may be raster scanned to be positioned at a plurality of corresponding detection locations in the focal plane of the receiving lens 140, as illustrated in FIG. 1. The scanning of the detector 160a is typically performed synchronously with the scanning of the light source 110a, so that the detector 160a and the light source 110a are always optically conjugate with each other at any given time.

By determining the time of flight for each light pulse emitted at a respective emission location, the distance from the LiDAR sensor 100 to each corresponding point on the surface of the object 150 may be determined. In some embodiments, the processor 190 is coupled with a position encoder that detects the position of the light source 110a at each emission location. Based on the emission location, the angle of the collimated light pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return light pulse 122' is measured and used to adjust the power of subsequent light pulses from the same emission point, in order to prevent saturation of the detector, improve eye-safety, or reduce overall power consumption. The power of the light pulse may be varied by varying the duration of the light pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the reflectivity, as determined by the intensity of the detected pulse, may also be used to add another dimension to the image. For example, the image may contain X, Y, and Z coordinates, as well as reflectivity (or brightness).

The angular field of view (AFOV) of the LiDAR sensor 100 may be estimated based on the scanning range of the light source 110a and the focal length of the emission lens 130 as, $$AFOV = 2\tan^{-1}\left(\frac{h}{2f}\right),$$

where h is scan range of the light source 110a along certain direction, and f is the focal length of the emission lens 130. For a given scan range h, shorter focal lengths would produce wider AFOVs. For a given focal length f, larger scan ranges would produce wider AFOVs. In some embodiments, the LiDAR sensor 100 may include multiple light sources disposed as an array at the back focal plane of the emission lens 130, so that a larger total AFOV may be achieved while keeping the scan range of each individual light source relatively small. Accordingly, the LiDAR sensor 100 may include multiple detectors disposed as an array at the focal plane of the receiving lens 140, each detector being conjugate with a respective light source. For example, the LiDAR sensor 100 may include a second light source 110b and a second detector 160b, as illustrated in FIG. 1. In other embodiments, the LiDAR sensor 100 may include four light sources and four detectors, or eight light sources and eight detectors. In one embodiment, the LiDAR sensor 100 may include eight light sources arranged as a 4×2 array and eight detectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 120 degrees, depending on the focal length of the emission lens, the scan range of each light source, and the number of light sources.

The light source 110a may be configured to emit light pulses in the ultraviolet, visible, or near infrared wavelength ranges. The energy of each light pulse may be in the order of microjoules, which is normally considered to be eye-safe for repetition rates in the KHz range. For light sources operating in wavelengths greater than about 1500 nm, the energy levels could be higher as the eye does not focus at those wavelengths. The detector 160*a* may comprise a silicon avalanche photodiode, a photomultiplier, a PIN diode, or other semiconductor sensors.

Figure 2:
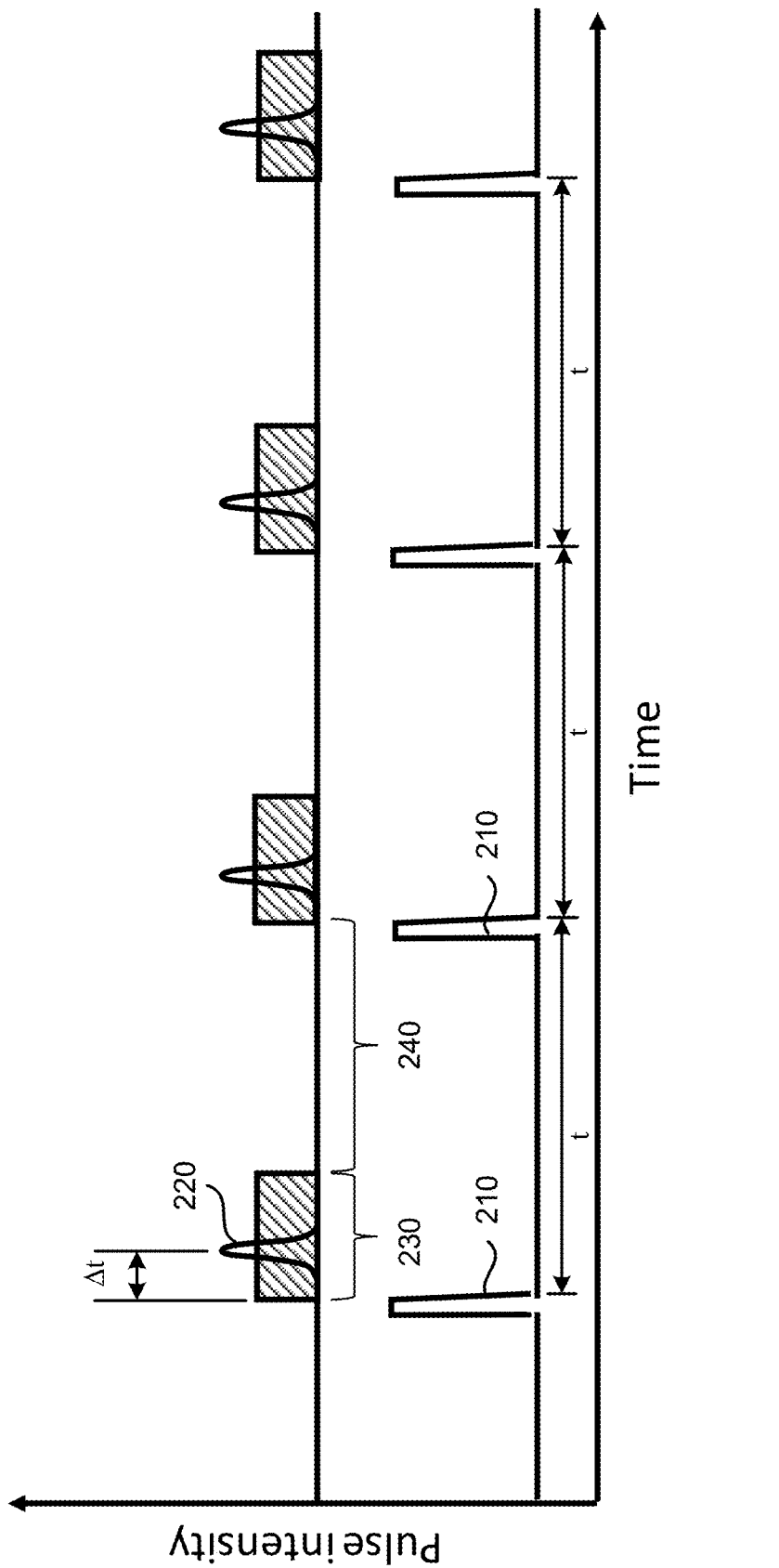
FIG. 2 shows an exemplary timing diagram of a train of emitted light pulses and a train of return light pulses.

A LiDAR may fire its light source at certain repetition rate. FIG. 2 shows, in the lower part, an exemplary timing diagram of a train of light pulses 210 emitted by a LiDAR sensor. The light pulses 210 may be substantially uniformly spaced from each other by a delay time t between adjacent pulses. The inverse of the delay time t is the repetition rate of the firing of the light source. The delay time t may range from a few hundreds of nanoseconds to a few tens of microseconds. For each light pulse 210, if reflected by an object within the field of view of the LiDAR sensor, a return light pulse 220 may be detected by a detector. The upper part of FIG. 2 shows the timing diagram of the return light pulses that may be detected by the LiDAR sensor. The time $\Delta t$ elapsed from the emission to the detection of a light pulse 220 can be used to estimate a distance D of the object from the LiDAR sensor. The time $\Delta t$ may be referred to as "time of flight." The distance D can be estimated based on the time of flight $\Delta t$ using the following formula:

$$D = c \times \frac{\Delta t}{2},$$

where c is the speed of light.

The detector may have a valid detection time window 230 after each light pulse 210 is emitted. During the detection time window 230, the detector is activated. The detector may be deactivated in the time window 240 following the detection time window 230, until the next light pulse 210 is emitted. Return light pulses that arrive outside the detection time window 230 are not registered, because they would not correspond to a valid operating distance for the LiDAR sensor.

Figures 3A, 3B:
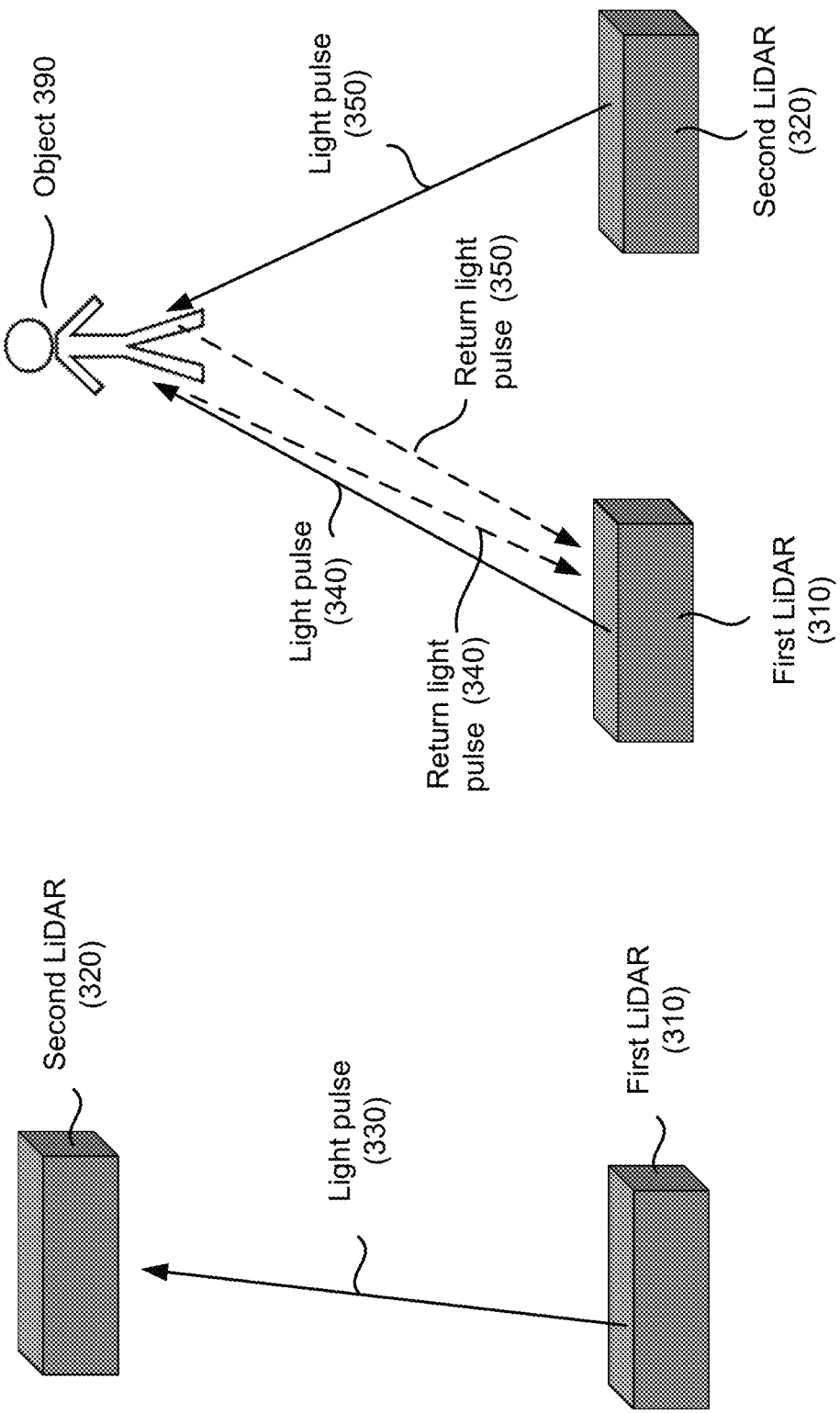
FIGS. 3A and 3B illustrate two simplified cases in which two LiDAR sensors and can interfere with each other.

In certain situations in which there are two or more LiDAR sensors operating in the vicinity of each other, interference between LiDAR sensors may occur. FIGS. 3A and 3B illustrate two simplified cases in which two LiDAR sensors 310 and 320 can interfere with each other. FIG. 3A illustrates an example of a direct interference between two LiDAR sensors. A first LiDAR sensor 310 may emit a light pulse 330, which happens to be directed toward a second LiDAR sensor 320. The second LiDAR sensor 320 may detect the light pulse 330 emitted by the first LiDAR sensor 310, and may erroneously consider it as a return light pulse emitted by itself. The detection of the interfering light pulse 330 by the second LiDAR sensor 320 can result in a false point in a three-dimensional point cloud created by the second LiDAR sensor 320. This situation may arise, for example, when two cars onto which the two LiDAR sensors are mounted are approaching each other from opposite directions.

FIG. 3B illustrates an example of an indirect interference. Assume that a first LiDAR 310 sensor and a second LiDAR sensor 320 are scanning the same scene at the same time. A first light pulse 340 emitted by the first LiDAR sensor 310 may bounce off an object 390 (e.g., a person) and return back to the first LiDAR sensor 310. The first LiDAR sensor 310 may estimate the distance of the object 390 from the first LiDAR sensor 310 by measuring the time of flight of the first light pulse 340. During the same time, the second LiDAR sensor 320 may emit a second light pulse 350, which may also bounce off the object 390. It is possible that the reflected second light pulse 350 may be detected by the first LiDAR sensor 310. The detection of the interfering light pulse 350 by the first LiDAR sensor 310 can result in a false point in a three-dimensional point cloud created by the first LiDAR sensor 310. This situation may arise, for example, when two cars onto which the two LiDAR sensors 310 and 320 are mounted are traveling side by side in the same direction in adjacent lanes.

Figure 4:
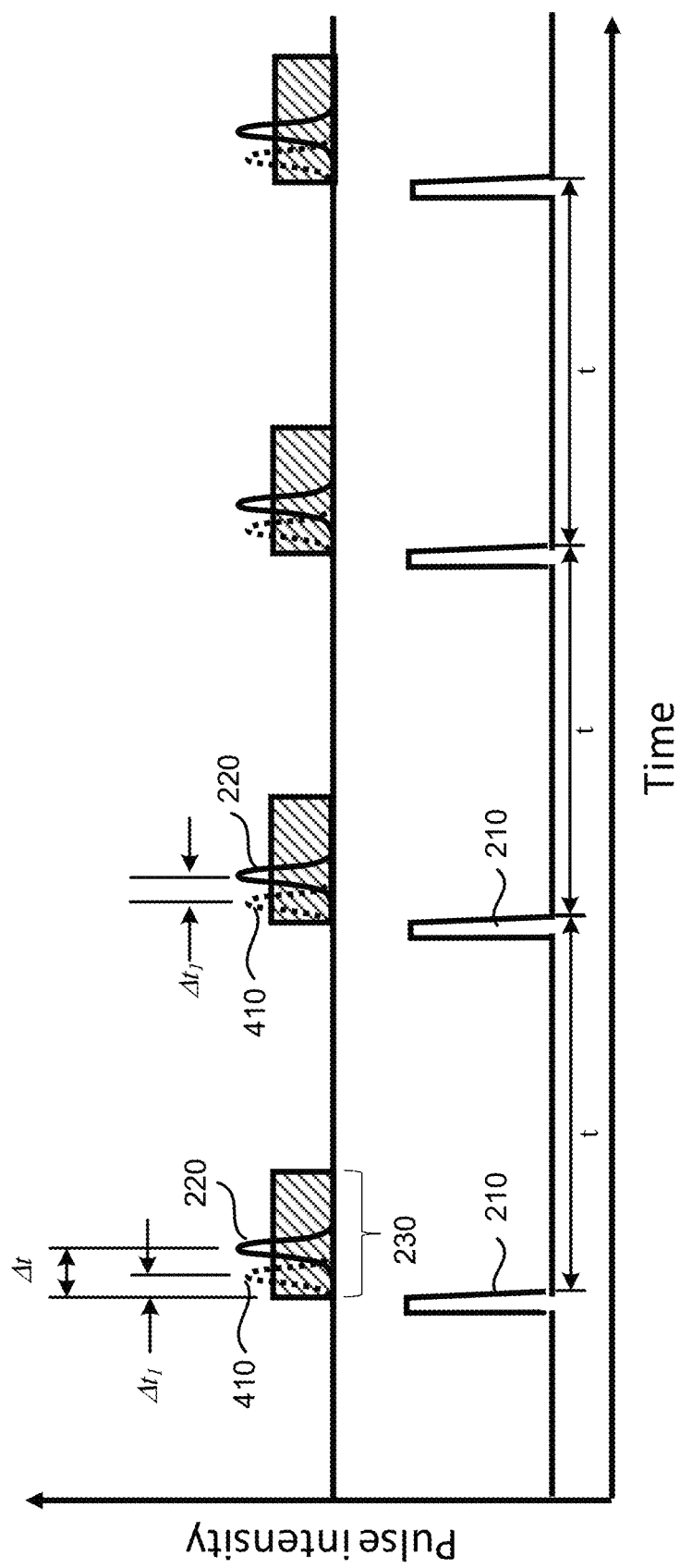
FIG. 4 shows an exemplary timing diagram of a train of emitted light pulses and a train of return light pulses, including possible interfering light pulses.

FIG. 4 shows, in the lower part, a timing diagram of a train of light pulses 210 that may be emitted from the first LiDAR sensor 310, similar to the timing diagram shown in FIG. 2. In the upper part of FIG. 4, in addition to the return light pulses 220 emitted from the first LiDAR sensor 310 itself, interference light pulses 410 (dotted lines) from the second LiDAR sensor 320 may also be detected by the first LiDAR sensor 310.

Assuming that the second LiDAR sensor 320 fires its light source at the same repetition rate as the first LiDAR sensor 310, the interference light pulses 410 detected by the first LiDAR sensor 310 can be almost time synchronous with the actual return light pulses 220, as illustrated in FIG. 4. For example, each interference light pulse 410 may be detected slightly before a respective return light pulse 220. Thus, a false point in a three-dimensional point cloud created by the first LiDAR sensor 310 may appear to be closer to the first LiDAR sensor 310 than what the object 390 actually is. Such false points may tend to appear close together spatially as groups in the point cloud to form a ghost object. The ghost object may appear to be stationary, as the interference light pulse 410 is detected with the same time of flight $\Delta t_2$ in consecutive detection windows 230.

For example, assume that the second LiDAR sensor 320 fires its light source 10 nanoseconds before the first LiDAR sensor 310 fires its light source. The interference light pulses 410 would be detected 10 nanoseconds before the return light pulses 220 are detected (e.g., $\Delta t - \Delta t_2 = 10$ ns). Thus, the ghost image may appear to be about 150 cm closer to the first LiDAR sensor 310 than what the actual object 390 is (light travels about 30 cm per nanosecond).

If the firing rate of the second LiDAR sensor is similar but not exactly the same as that of the first LiDAR sensor, the ghost object may appear to be moving either toward or away from the first LiDAR sensor. The speed at which the ghost object moves is a function of the differential firing rate between the two LiDAR sensors. The farther apart the two firing rates, the faster the ghost object may appear to move.

For example, assume that the second LiDAR sensor 320 fires its light source at a rate that is faster than that of the first LiDAR sensor 310 by 1 nanosecond per second. After one second, the delay between the firing of the first LiDAR sensor 310 and the firing of the second LiDAR sensor 320 may be reduced to 9 nanoseconds (e.g., $\Delta t - \Delta t_1 = 9$ ns). Thus, the ghost object may appear to be only 135 cm from the first LiDAR sensor 310. As this process continues, the ghost object may appear to move toward the first LiDAR sensor 310 at a rate of 15 cm per second. On the other hand, if the second LiDAR sensor 320 fires its light source at a rate that is slower than that of the first LiDAR sensor 310, the ghost object may appear to move away from the first LiDAR sensor 310.

According to some embodiments, each LiDAR sensor can be assigned a unique firing rate. Enough unique firing rates may be available such that it is unlikely that any two LiDAR sensors would have the same firing rate. For example, if the nominal firing rate is 1.000 MHz, each LiDAR sensor may be assigned a firing rate from a table including {0.990, 0.991, 0.992 . . . 1.010}.

Now take the case where sensor 1 is firing at 1.000 MHz, and sensor 2 is firing at 1.001 MHz. Every second, the sensor 1 will fall 1 msec farther behind sensor 2. This may cause the ghost object to appear to move at 150 km/sec. In actuality, the ghost object will be broken up into a streak of isolated points. The isolated ghost points can then be assigned a quality factor to help distinguish them from real points, described later in more detail.

According to some embodiments, a LiDAR system may apply temporal dithering to the firing sequence of its light source(s) in order to be able to detect false points in a point cloud resulting from interference. For each light pulse in an otherwise uniformly spaced train of light pulses, a randomized temporal shift may be applied so that the temporal spacings between adjacent light pulses are random. The term "random" or "randomized" herein may refer to random, as well as pseudorandom or any irregular pattern.

Figure 5:
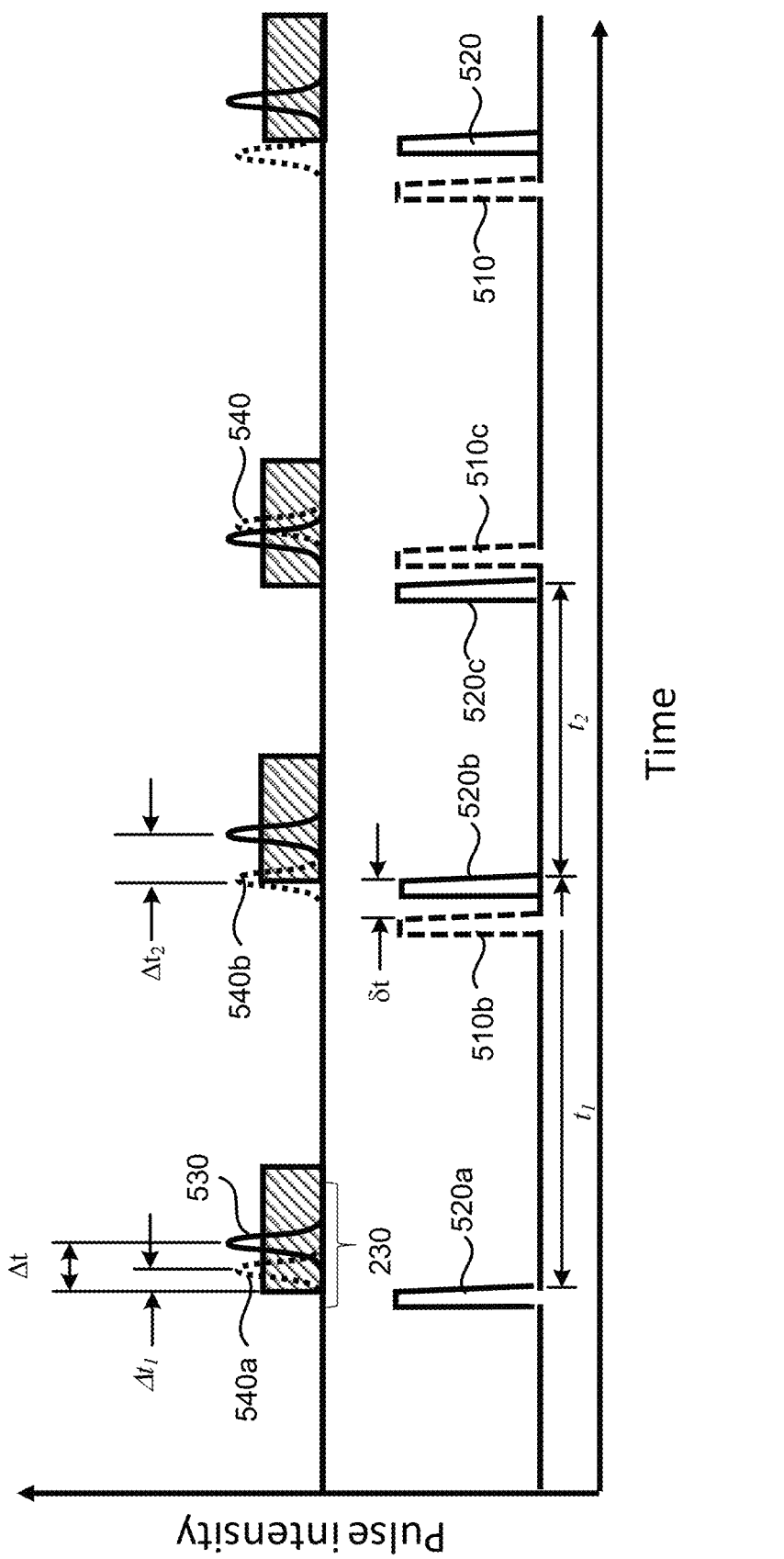
FIG. 5 shows an exemplary timing diagram of a train of emitted light pulses and a train of return light pulses, as well as possible interfering light pulses, while a temporal dithering is applied according to some embodiments.

FIG. 5 shows an exemplary timing diagram of light source firing of a LiDAR sensor according to some embodiments. In the lower part of FIG. 5, the dashed lines represent the nominal temporal positions of a uniformly spaced train of light pulses 510; and the solid lines represent a temporally dithered train of light pulses 520. As illustrated, each light pulse 520 is temporally shifted with respect to a corresponding nominal temporal position by an amount δt. The magnitude of the temporal shift Δt, as well as its direction (plus or minus sign), are randomized. According to some embodiments, δt may range from about −200 nanoseconds to about +200 nanoseconds. Thus, the temporal spacings between adjacent light pulses are also random. For example, the temporal spacing $t_1$ between the light pulse 520a and the light pulse 520b may be different from the temporal spacing $t_2$ between the light pulse 520b and the light pulse 520c, etc.

In the upper part of FIG. 5, the solid lines represent the actual return light pulses 530 that are emitted by the LiDAR sensor itself; the dotted lines represent the interference light pulses 540 from another LiDAR sensor. Assume that the interference light pulses 540 arrive at the detector at regular time intervals. As a result of the random shifting of the light pulses 520 emitted by the LiDAR sensor itself, the apparent times of flight for the train of interfering light pulses may differ from each other in a random fashion. For example, the time of flight $\Delta t_1$ for the interfering light pulse 540a may be different from the time of flight $\Delta t_2$ for the next interfering light pulse 540b, etc.

Thus, by applying a random temporal dithering to the light source firing sequence, the false points of a ghost object in a point cloud may be broken up into spatially scattered and isolated points. The spatial extent of the "scatter" may depend on the range of temporal dithering. For example, if the temporal dithering δt ranges from −200 nanoseconds to +200 nanoseconds, the false points of the ghost object may be scattered up to 30 meters either closer or farther away from where the ghost object would appear to be without the temporal dithering.

Figure 6A:
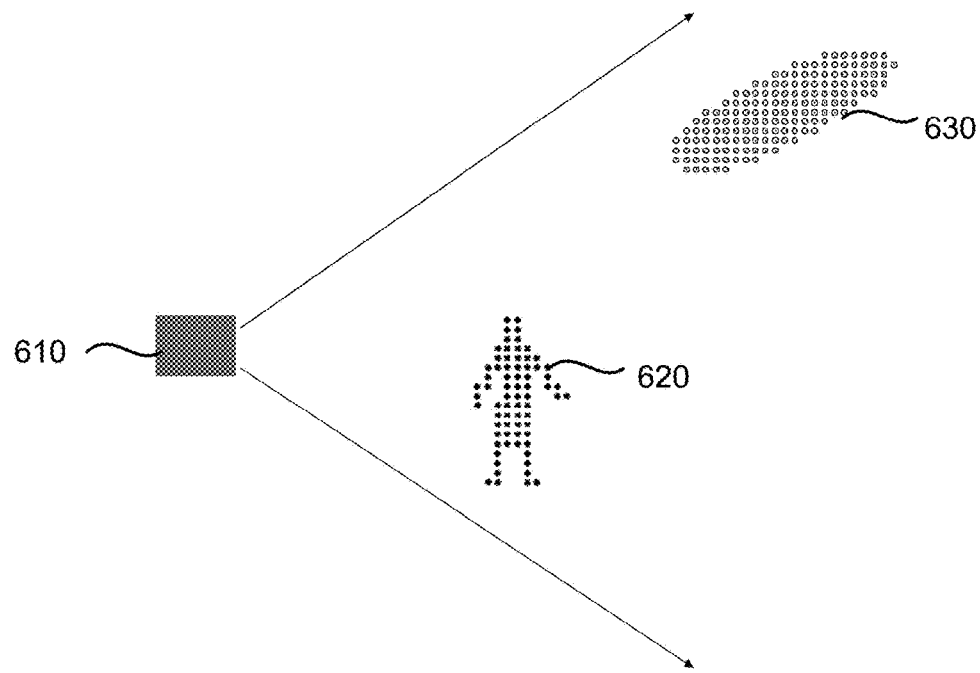
FIG. 6A shows an exemplary point cloud acquired by a LiDAR sensor without applying temporal dithering to the laser firing sequence.

FIG. 6A shows an exemplary point cloud acquired by a LiDAR sensor 610 without applying temporal dithering to the laser firing sequence. The point cloud may include points 620 that represent real objects (e.g., a person), as well as false points 630 that are caused by interference from another LiDAR sensor that is nearby (not shown). As illustrated, the false points 630 may be located close to each other and may appear as a ghost object.

Figure 6B:
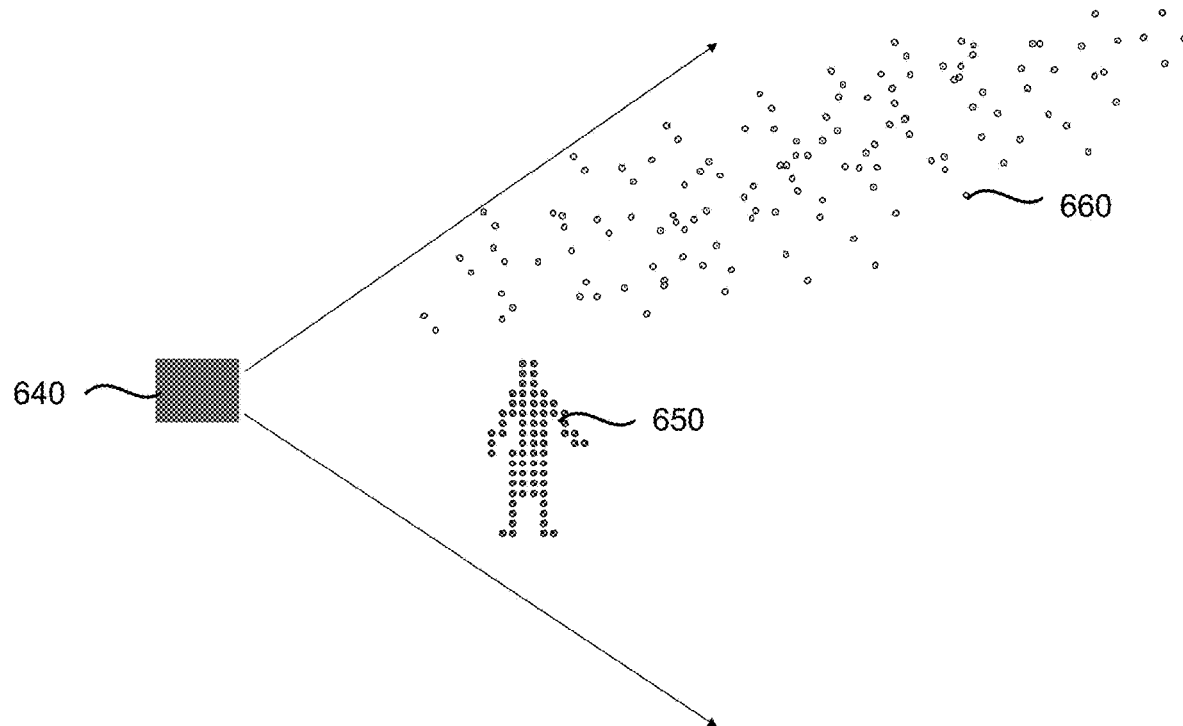
FIG. 6B shows an exemplary point cloud acquired by a LiDAR sensor for the same scene as shown in FIG. 6A, but while applying temporal dithering to the light source firing sequence according to some embodiments.

FIG. 6B shows an exemplary point cloud acquired by a LiDAR sensor 640 for the same scene as shown in FIG. 6A, but while applying temporal dithering to the light source firing sequence according to some embodiments. The point cloud may also include points 650 that represent real objects, as well as false points 660. Compared to FIG. 6A, the false points 660 are scattered into isolated points that occupy a greater spatial region. Because the false points 660 are scattered and isolated, it may be easier to identify those points as being false points due to interference.

Figure 7:
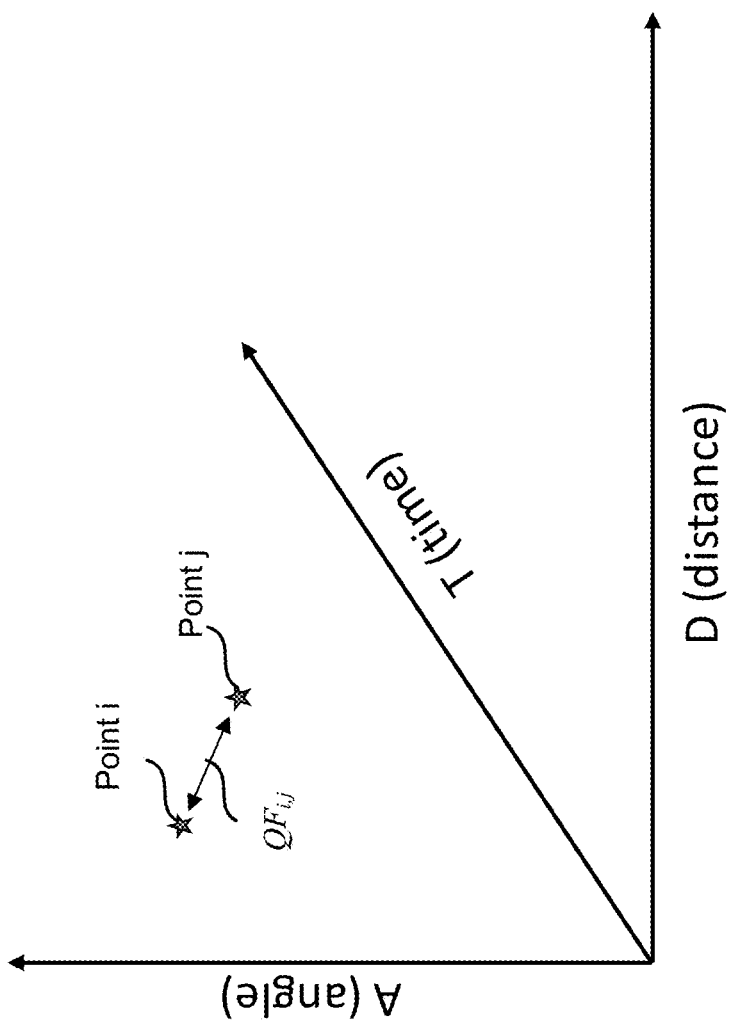
FIG. 7 illustrate a three-dimensional coordinate space for points in a point cloud acquired by a LiDAR sensor.

According to some embodiments, the spatial and temporal relationships among the points in a point cloud acquired by a LiDAR sensor while applying temporal dithering can be analyzed. The likelihood of any given point being a false point caused by interference can be evaluated based on such analyses. As illustrated in FIG. 7, each point in the point cloud may be characterized by a three-dimensional coordinate. The three dimensions can include the angle A from the point to the LiDAR sensor, range D from the point to the LiDAR sensor, and time T when the point was acquired. The angle A is a vector sum of a horizontal angle and a vertical angle.

According to some embodiments, a quality factor can be evaluated for each point in the point cloud using a non-linear weighted combination of angles, ranges, and times between the point and its neighboring points. For a respective point in a point cloud with index i, a partial quality factor $QF_{i,j}$ with respect to a neighboring point j may be evaluated as:

$$QF_{i,j} = \frac{1}{(a(\Delta A)^{n_1} + b(\Delta D)^{n_2} + c(\Delta T)^{n_3} + d)^{n_4}}, \quad (1)$$

where ΔA is the angular separation between point i and point j, ΔD is the range separation between point i and point j, ΔT is the temporal separation between point i and point j (e.g., the time elapsed between the detection of the two points, or the difference in frame numbers between the detection of the two points), a, b, and c are weights, d is a constant, and $n_1$, $n_2$, $n_3$, and $n_4$ are positive power factor constants.

In some embodiments, $n_1=n_2=n_3=2$, and $n_4=\frac{1}{2}$. Thus, the partial quality factor $QF_{i,j}$ may be evaluated as:

$$QF_{i,j} = \frac{1}{(a(\Delta A)^2 + b(\Delta D)^2 + c(\Delta T)^2 + d)^{\frac{1}{2}}}. \quad (2)$$

The partial quality factor $QF_{i,j}$ expressed in equation (2) may be considered as the three-dimensional separation between point i and point j, as illustrated in FIG. 7. In general, the value of the partial quality factor $QF_{i,j}$ is inversely proportional to the spatial and temporal separation between point i and point j. That is, the greater the spatial and temporal separation, the smaller the value of $QF_{i,j}$.

The overall quality factor $QF_i$ for point i may be evaluated as:

$$QF_i = \Sigma_j QF_{i,j}, \quad (3)$$

where the summation is over all other neighboring points of point i that give rise to a value of the partial quality factor $QF_{i,j}$ that is above a threshold value (i.e., neighboring points that are too far separated from point i may be neglected for evaluating the quality factor $QF_i$). The value of the quality factor $QF_i$ can provide an indication of the likelihood of point i being a false point due to interference. For example, points representing a real object may tend to be closely located with respect to each other, both spatially and temporally. Therefore, real points may have higher quality factor values. On the other hand, false points due to interference may be scattered and isolated with respect to each other as a result of temporal dithering of the light source firing, as discussed above. Therefore, false points may have lower quality factor values.

According to some embodiments, the quality factor values can be used by a perception software to determine how much weight to give any given point in a point cloud acquired by the LiDAR sensor. For example, when the LiDAR sensor is used for obstacle detection in an autonomous vehicle, a perception software may ignore points that have quality factor values below a certain threshold value. In some embodiments, the threshold value can be predetermined, or dynamically adjusted.

According to some embodiments, the perception software may combine the LiDAR sensor data (e.g., point cloud data with associated quality factor values) with other sensor data for detecting obstacles. The other sensor data may include, for example, camera data and radar data. For instance, a point from the LiDAR sensor may have a relatively low quality factor value, yet that point is consistent with weak signals from a radar or a camera. The perception software can take data from all sensors into consideration, and may determine that the point in question represents an obstacle, even though data from each individual sensor may not be sufficient to make such a determination.

According to some embodiments, the quality factor many also take into account other factors, such as noise levels and noise signatures of the detector, in addition to the spatial and temporal relationships with neighboring points. For example, sunlight, rain, fog, and snow can add noise to the detected signal, which can result in spurious points in the point cloud. According to some embodiments, a LiDAR system can extract a noise value and add it to the quality factor expressed in equations (1) and (3). In some embodiments, signal strength and pulse width can also be added to the quality factor. Also, if more than one return pulse is detected within a detection time window, that may be indicative of the presence of an interference pulse and can be used to adjust the value of the quality factor.

According to some embodiments, the perception software may adjust its treatment of "suspicious" points based on environmental conditions. For example, fog, rain, and snow can also result in spurious points that have relatively low quality factor values. The perception software may be able to determine, based on the nature of the points or input from other sources (e.g., windshield wiper operation), that those points are due to weather conditions rather than interference from other LiDAR sensors. Thus, the perception software may adjust its response accordingly.

In some embodiments, taken in aggregate, the number of points with low quality factor values can indicate the presence of an interfering LiDAR sensor in the vicinity, as well as the general direction of the interfering LiDAR sensor. For example, if another vehicle is detected in that direction, it may be possible to associate the interfering LiDAR sensor with the detected vehicle.

A LiDAR sensor may include multiple light sources, each of which may cover a sub field of view. The LiDAR sensor can fire the multiple light sources sequentially. According to some embodiments, a random time delay may be applied between adjacent rounds of firing. Additionally or alternatively, the order of the firing of the multiple light sources can be randomly varied from one round to the next round.

Figure 8:
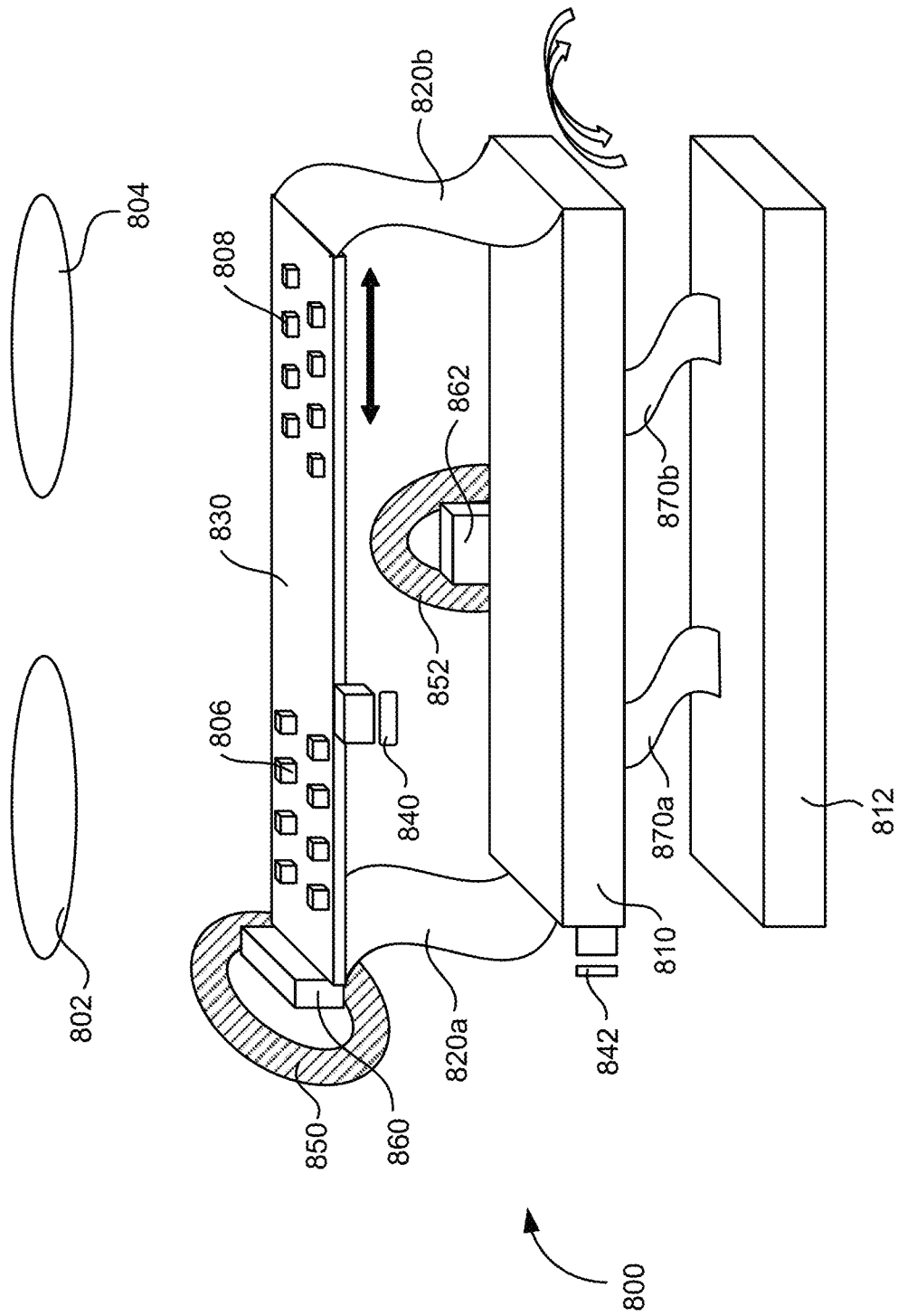
FIG. 8 shows schematically a LiDAR sensor that include an array of light sources and an array of detectors.

FIG. 8 shows schematically a LiDAR sensor 800 that may include an array of light sources 806 (e.g., a 4×2 array of light sources) and an array of detectors 808 (e.g., a 4×2 array of light sources). The array of light sources 806 and the array of detectors 808 can be mounted on the same rigid platform 830. The positions of the light sources 806 and the positions of the detectors 808 are arranged such that each light source 806 is spatially conjugate with a corresponding detector 808. The platform 830 can be coupled to a first base plate 810 by a first flexure comprising two flexure elements 820a and 820b. The flexure elements 820a and 820b can be deflected to the left or right by using a single actuator, such as a voice coil 850 and a permanent magnet 860 as shown in FIG. 8, or by a piezoelectric actuator, and the like. In one embodiment, the first base plate 810 can be coupled to a second base plate 812 by a second flexure comprising two flexure elements 870a and 870b. The flexure elements 870a and 870b can be deflected forward or backward by using a single actuator, such as a voice coil 852 and a permanent magnet 862 as shown in FIG. 8, or by a piezoelectric actuator, and the like.

Thus, the light sources 806 and the detectors 160a-160d can be scanned in two dimensions in the focal planes of the emission lens 802 and the receiving lens 804, respectively, by the left-right movements of the flexure elements 820a and 820b, and by the forward-backward movements of the flexure elements 870a and 870b. Because the light sources 806 and the detectors 808 are mounted on the same rigid platform 830, the conjugate spatial relationship between each laser-detector pair is maintained as they are scanned, provided that the lens prescriptions for the emission lens 804 and the receiving lens 802 are essentially identical. It should be appreciated that, although eight light sources 806 and eight detectors 808 are shown as an example in FIG. 8, fewer or more light sources and fewer or more detectors may be mounted on a single platform 830.

In some embodiments, a first position encoder 840 may be disposed adjacent the platform 830 for detecting coordinates of the light sources 806 in the left-right direction (i.e., the x-coordinates), and a second position encoder 842 may be disposed adjacent the first base plate 810 for detecting coordinates of the light sources 806 in the forward-backward direction (i.e., the y-coordinates). The first position encoder 840 and the second position encoder 842 may input the x-y coordinates of the light sources 806 to a processor to be used for constructing a three-dimensional image of a scene.

Figure 9:
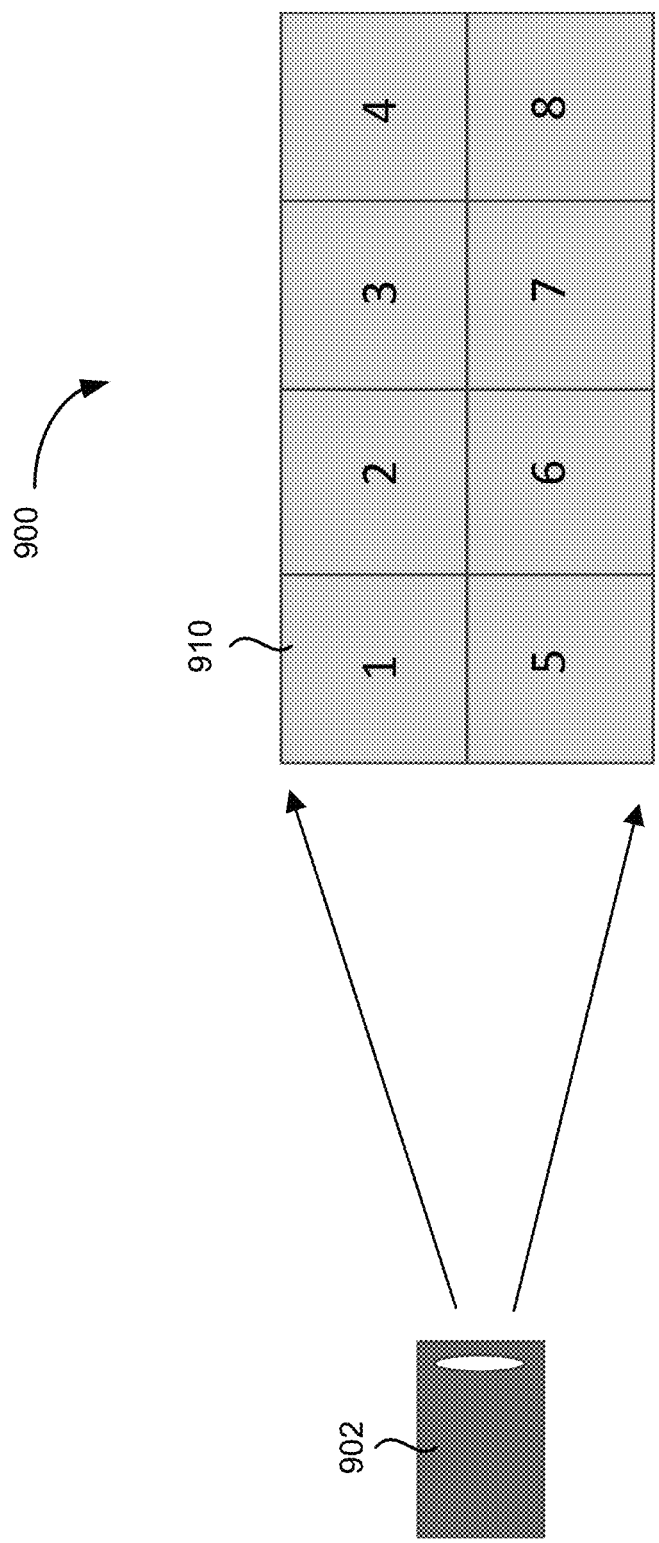
FIG. 9 shows an exemplary field of view of a LiDAR sensor, including an array of sub fields of views by an array of light sources.

FIG. 9 shows an exemplary field of view 900 of a LiDAR sensor 902 according to some embodiments. The LiDAR sensor 902 may include eight light sources arranged as a 4×2 array (e.g., as in the LiDAR sensor illustrated in FIG. 8). Each light source can be scanned to cover a respective sub field of view 910. The sub fields of view 910 of the eight light sources (labeled with numerals 1-8) can be tiled together to form the entire field of view 900 of the LiDAR sensor 902.

Figure 10:
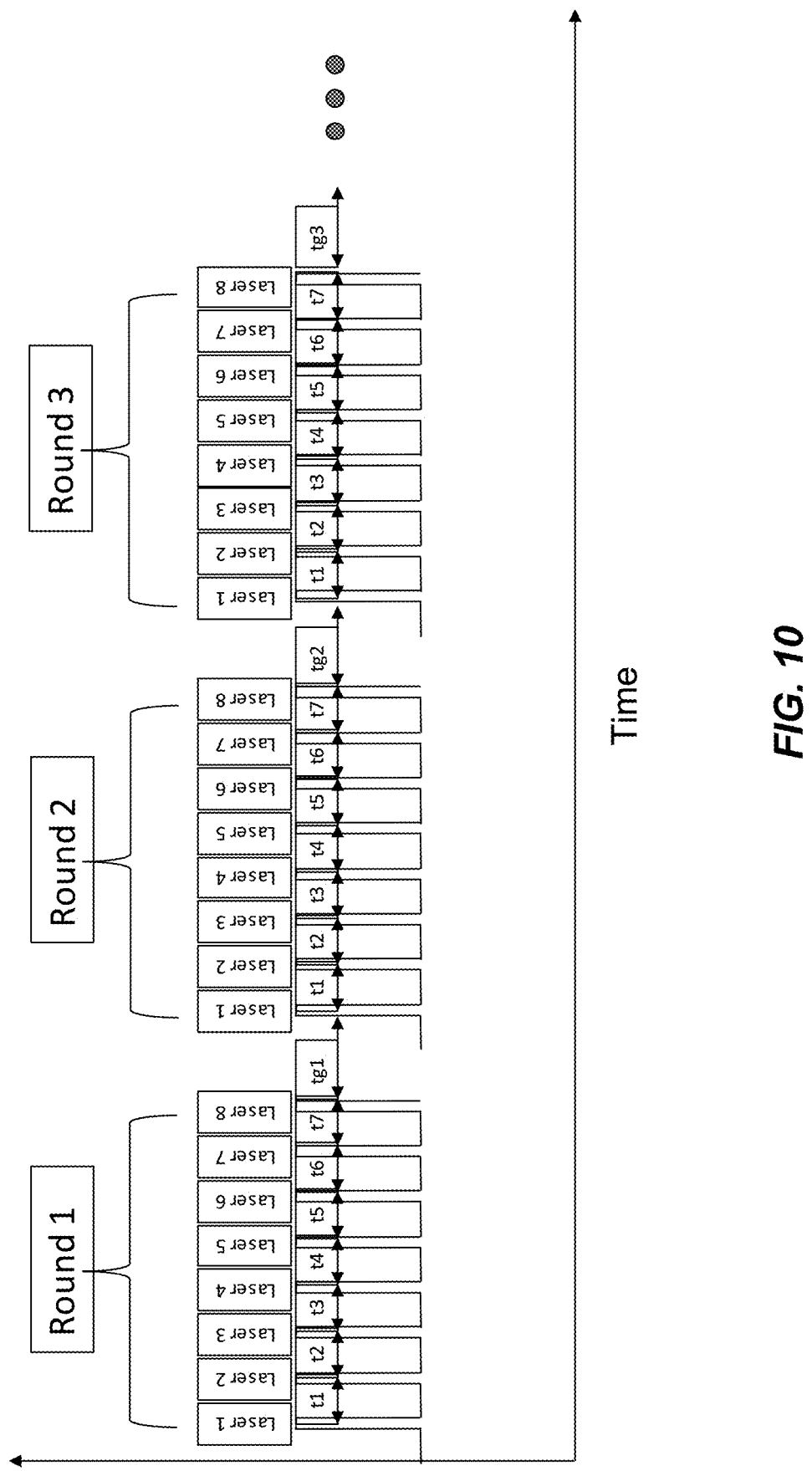
FIG. 10 shows an exemplary firing sequence of an array of light sources according to some embodiments.

According to some embodiments, the eight light sources may be fired sequentially. FIG. 10 shows an exemplary firing sequence. For example, in each round, laser #1 is fired; then laser #2 is fired after a delay time $t_1$; then laser #3 is fired after a delay time $t_2$; and so on and so forth until laser #8 is fired. After the first round is completed, the second round may start after a delay time $tg_1$; similarly, after the second round is completed, the third round may start after a delay time $tg_2$; and so on and so forth. According to some embodiments, the delay times $tg_1$, $tg_2$, . . . between consecutive rounds can be random. The delay times $t_1$, $t_2$, . . . $t_7$ between consecutive firings within a round can be the same, or can be random. In both cases, false points due to interference can be scattered so as to enable their detection by means of low quality factor values, as discussed above.

Figure 11:
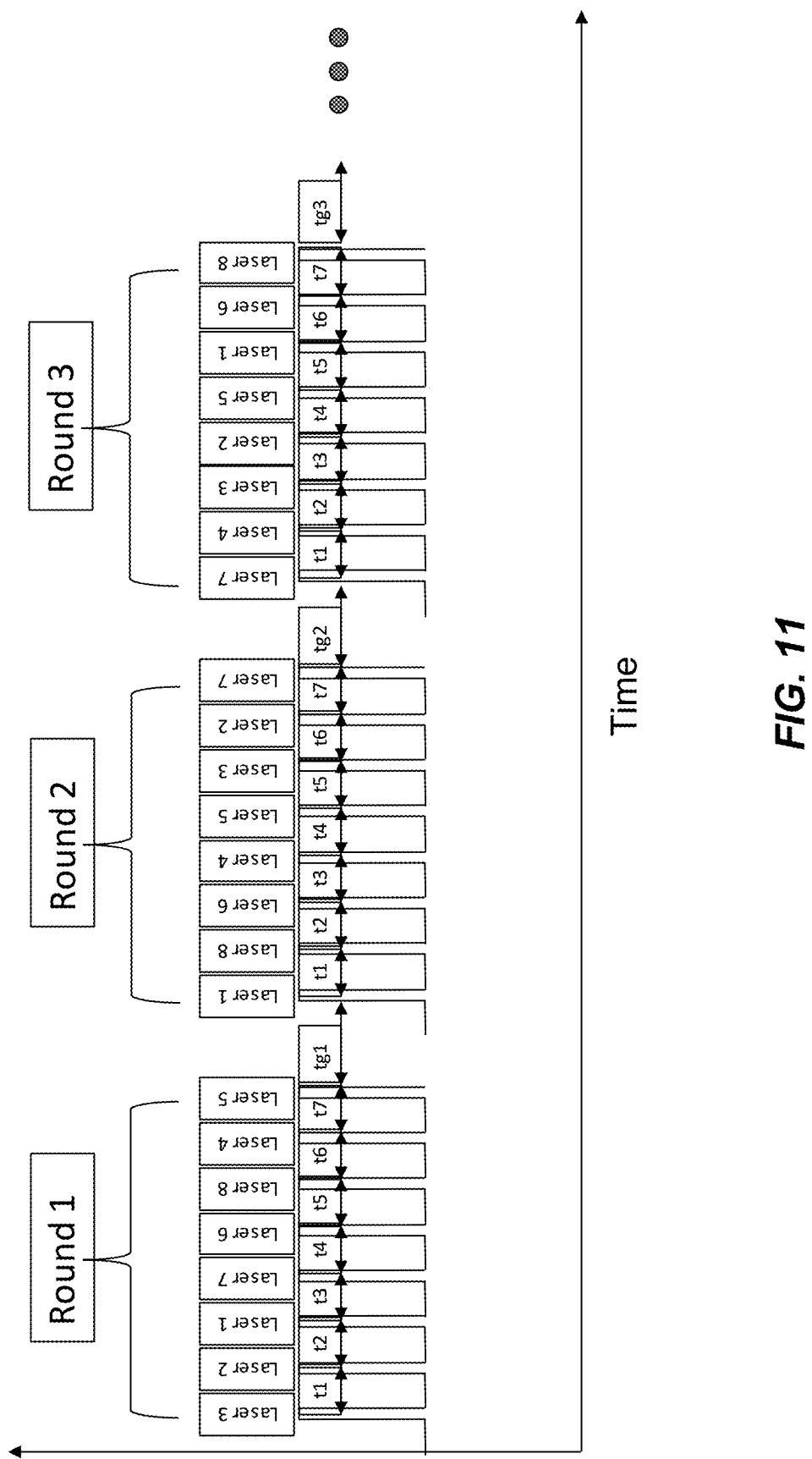
FIG. 11 shows an exemplary firing sequence of an array of light sources according to some other embodiments.

FIG. 11 shows a firing sequence according to some other embodiments. Here, instead of firing lasers #1 to #8 in a sequential order in each round, the order of firing can be random from one round to the next round. For example, as illustrated in FIG. 11, in the first round, the order of firing may be #3, #2, #1, #7, #6, #8, #4, #5; whereas in the second round, the order of firing may be #1, #8, #6, #4, #5, #3, #2, #7; and so on and so forth. In this manner, false points due to interference can also be scattered so as to enable their detection as false points. In some embodiments, the delay times $t_1, t_2, \ldots t_7$ between consecutive firings within a round are the same, and the delay times $tg_1, tg_2, \ldots$ between consecutive rounds are the same. In some other embodiments, the delay times $t_1, t_2, \ldots t_7$ and/or the delay times $tg_1, tg_2, \ldots$ can also be random.

Figure 12:
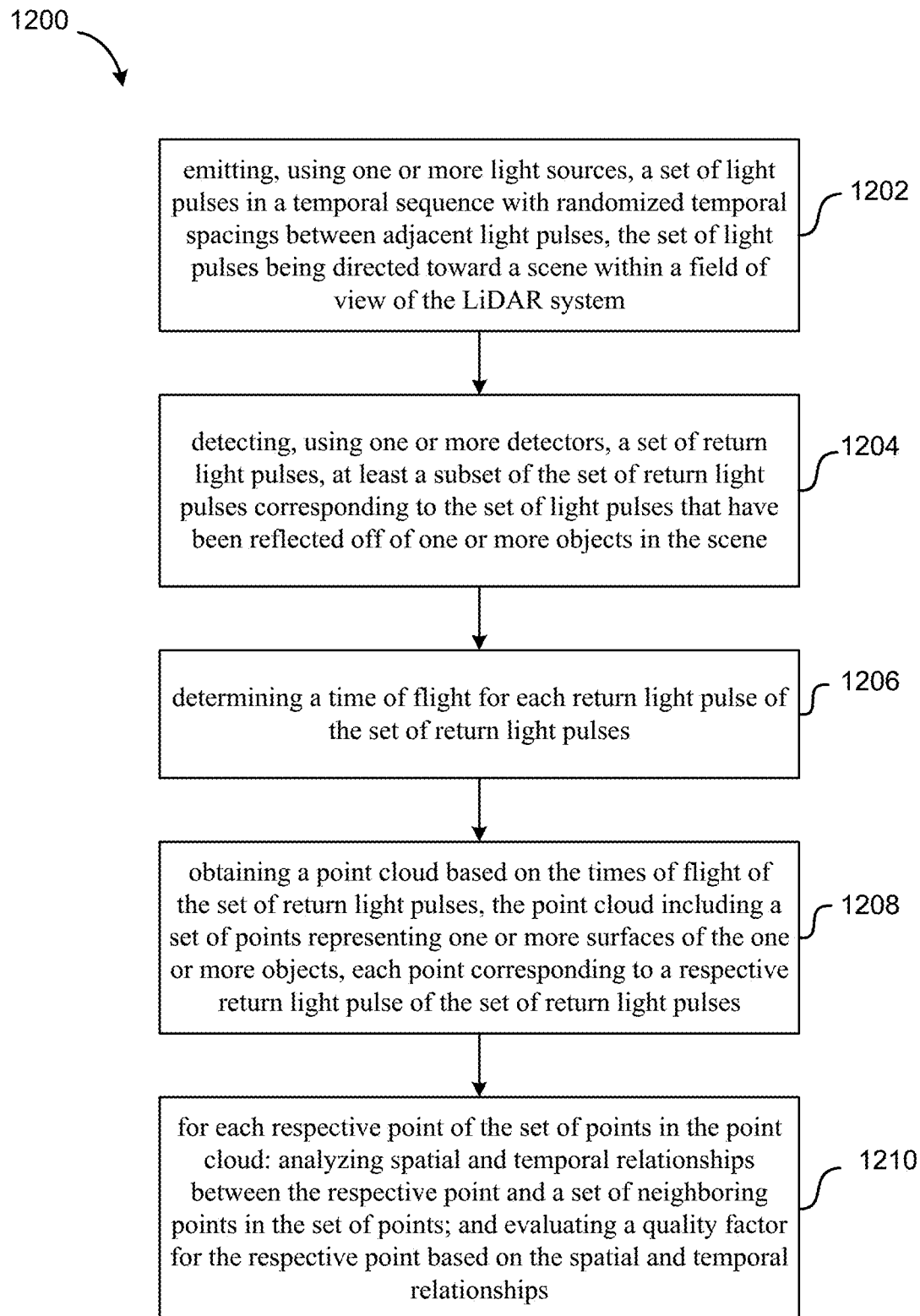
FIG. 12 shows a simplified flowchart illustrating a method of operating a LiDAR system according to some embodiments.

FIG. 12 shows a simplified flowchart illustrating a method 1200 of operating a LiDAR system according to an embodiment.

The method 1200 include, at 1202, emitting, using one or more light sources, a set of light pulses in a temporal sequence with randomized temporal spacings between adjacent light pulses. The set of light pulses is directed toward a scene within a field of view of the LiDAR system.

The method 1200 further include, at 1204, detecting, using one or more detectors, a set of return light pulses. At least a subset of the set of return light pulses corresponds to the set of light pulses that have been reflected off of one or more objects in the scene.

The method 1200 further include, at 1206, determining a time of flight for each return light pulse of the set of return light pulses; and at 1208, obtaining a point cloud based on the times of flight of the set of return light pulses. The point cloud includes a set of points representing one or more surfaces of the one or more objects. Each point corresponds to a respective return light pulse of the set of return light pulses.

The method 1200 further include, at 1210, for each respective point of the set of points in the point cloud: analyzing spatial and temporal relationships between the respective point and a set of neighboring points in the set of points; and evaluating a quality factor for the respective point based on the spatial and temporal relationships.

It should be appreciated that the specific steps illustrated in FIG. 12 provide a particular method of operating a LiDAR system according to some embodiments. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

Figure 13:
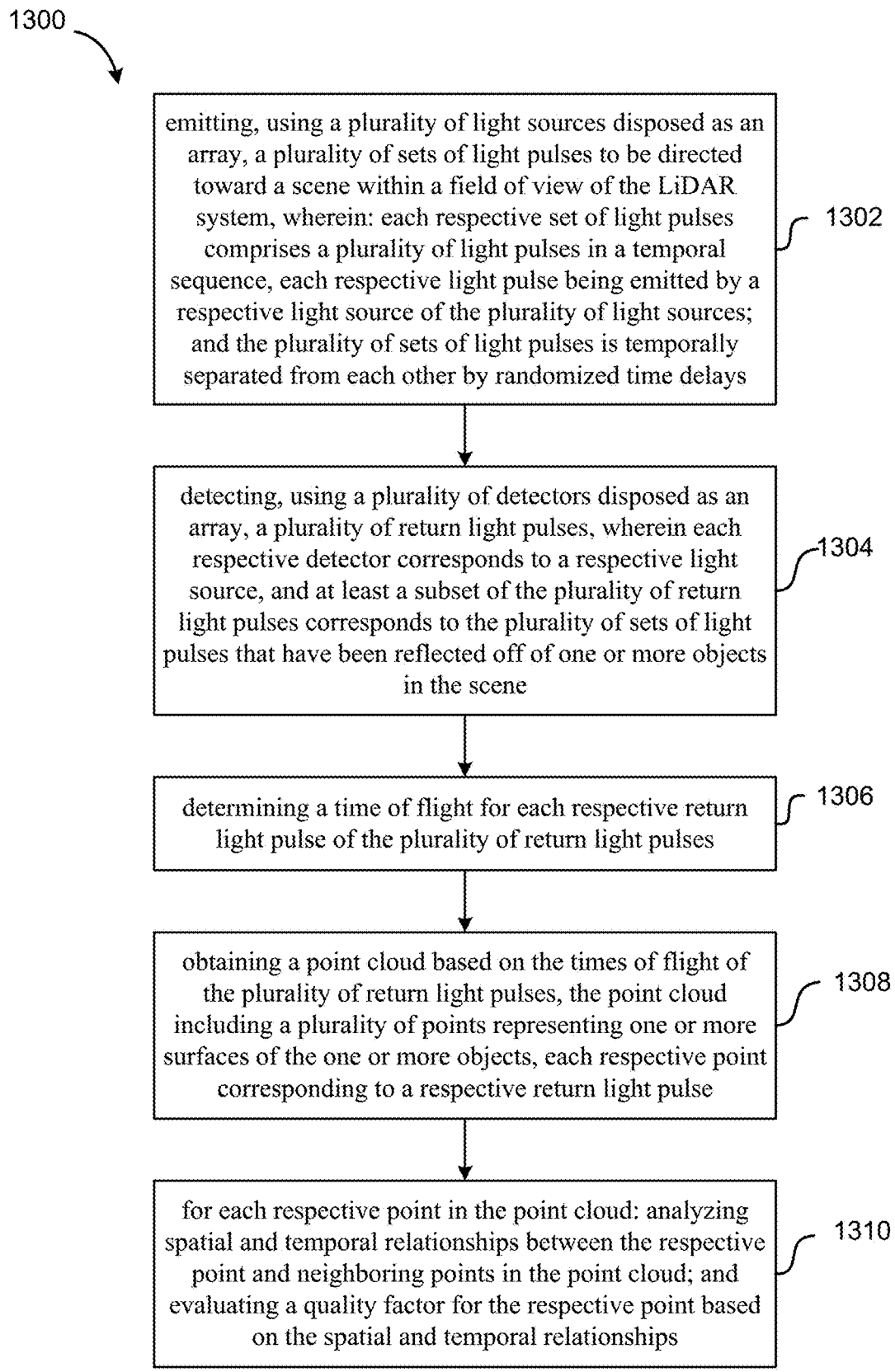
FIG. 13 shows a simplified flowchart illustrating a method of operating a LiDAR system according to some embodiments.

FIG. 13 shows a simplified flowchart illustrating a method 1300 of operating a LiDAR system according to an embodiment.

The method 1300 includes, at 1302, emitting, using a plurality of light sources disposed as an array, a plurality of sets of light pulses to be directed toward a scene within a field of view of the LiDAR system. Each respective set of light pulses comprises a plurality of light pulses in a temporal sequence. Each respective light pulse is emitted by a respective light source of the plurality of light sources. The plurality of sets of light pulses is temporally separated from each other by randomized time delays.

The method 1300 further includes, at 1304, detecting, using a plurality of detectors disposed as an array, a plurality of return light pulses. Each respective detector corresponds to a respective light source. At least a subset of the plurality of return light pulses corresponds to the plurality of sets of light pulses that have been reflected off of one or more objects in the scene.

The method 1300 further includes, at 1306, determining a time of flight for each respective return light pulse of the plurality of return light pulses; and at 1308, obtaining a point cloud based on the times of flight of the plurality of return light pulses. The point cloud includes a plurality of points representing one or more surfaces of the one or more objects. Each respective point corresponds to a respective return light pulse.

The method 1300 further includes, at 1310, for each respective point in the point cloud: analyzing spatial and temporal relationships between the respective point and neighboring points in the point cloud; and evaluating a quality factor for the respective point based on the spatial and temporal relationships.

It should be appreciated that the specific steps illustrated in FIG. 13 provide a particular method of operating a LiDAR system according to some embodiments. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

Figure 14:
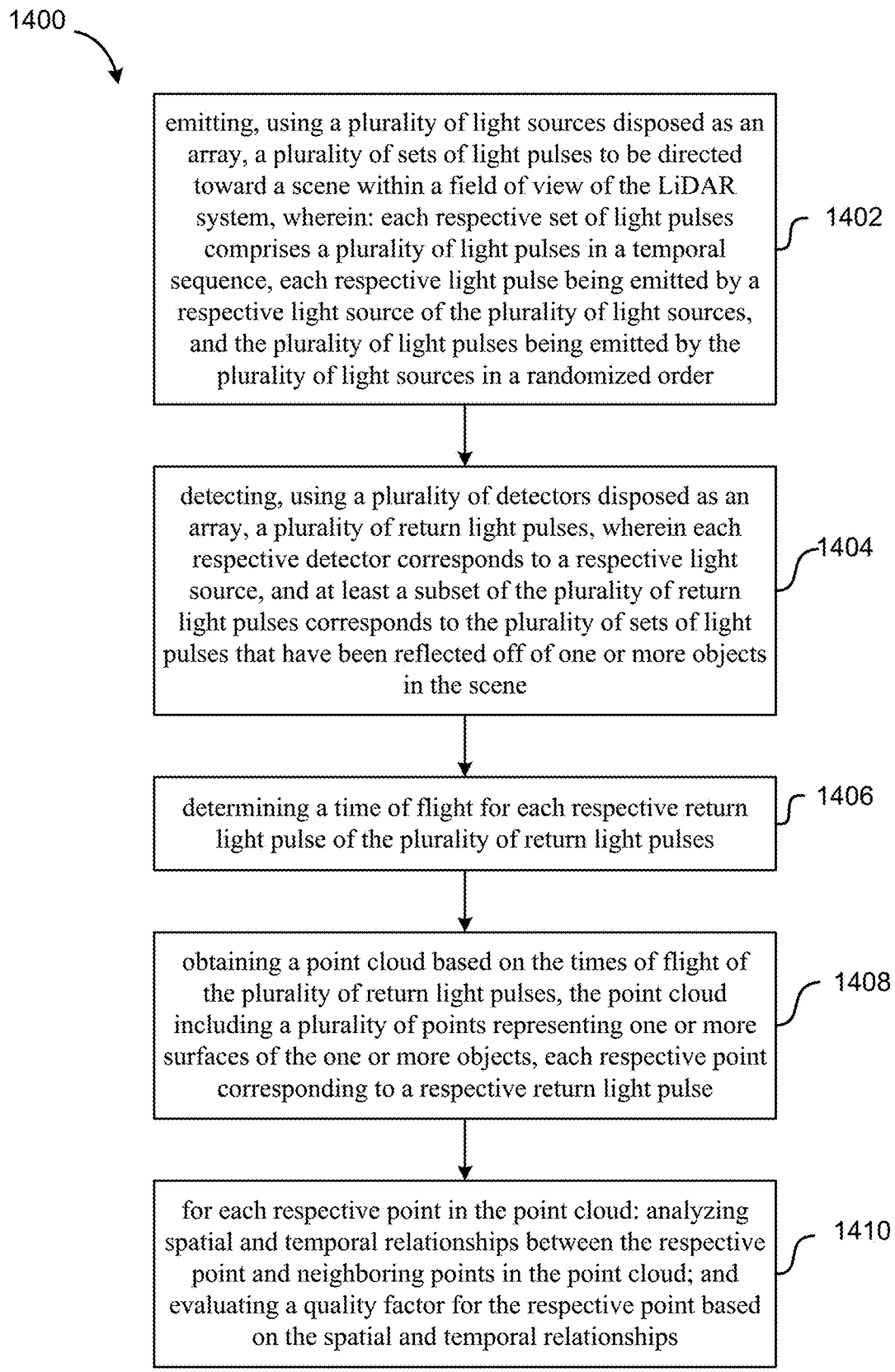
FIG. 14 shows a simplified flowchart illustrating a method of operating a LiDAR system according to some embodiments.

FIG. 14 shows a simplified flowchart illustrating a method 1400 of operating a LiDAR system according to an embodiment.

The method 1400 includes, at 1402, emitting, using a plurality of light sources disposed as an array, a plurality of sets of light pulses to be directed toward a scene within a field of view of the LiDAR system. Each respective set of light pulses comprises a plurality of light pulses in a temporal sequence. Each respective light pulse is emitted by a respective light source of the plurality of light sources. The plurality of light pulses is emitted by the plurality of light sources in a randomized order.

The method 1400 further includes, at 1404, detecting, using a plurality of detectors disposed as an array, a plurality of return light pulses. Each respective detector corresponds to a respective light source. At least a subset of the plurality of return light pulses corresponds to the plurality of sets of light pulses that have been reflected off of one or more objects in the scene.

The method 1400 further includes, at 1406, determining a time of flight for each respective return light pulse of the plurality of return light pulses; and at 1408, obtaining a point cloud based on the times of flight of the plurality of return light pulses. The point cloud includes a plurality of points representing one or more surfaces of the one or more objects. Each respective point corresponds to a respective return light pulse.

The method 1400 further includes, at 1410, for each respective point in the point cloud: analyzing spatial and temporal relationships between the respective point and neighboring points in the point cloud; and evaluating a quality factor for the respective point based on the spatial and temporal relationships.

It should be appreciated that the specific steps illustrated in FIG. 14 provide a particular method of operating a LiDAR system according to some embodiments. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A LiDAR system comprising:
a plurality of light sources disposed as an array and configured to emit a plurality of sets of light pulses to be directed toward a scene within a field of view of the LiDAR system, wherein each respective set of light pulses comprises a plurality of light pulses in a temporal sequence, each respective light pulse being emitted by a respective light source of the plurality of light sources;
a plurality of detectors disposed as an array, each respective detector corresponding to a respective light source, the plurality of detectors configured to detect a plurality of return light pulses, at least a subset of the plurality of return light pulses corresponding to the plurality of sets of light pulses that have been reflected off of one or more objects in the scene; and
a processor coupled to the plurality of light sources and the plurality of detectors, the processor configured to:
determine a time of flight for each respective return light pulse of the plurality of return light pulses;
obtain a point cloud based on the times of flight of the plurality of return light pulses, the point cloud including a plurality of points representing one or more surfaces of the one or more objects, each respective point corresponding to a respective return light pulse; and
for each respective point in the point cloud:
analyze spatial and temporal relationships between the respective point and neighboring points in the point cloud; and
evaluate a quality factor for the respective point based on the spatial and temporal relationships.

2. The LiDAR system of claim 1 wherein:
the point cloud includes a plurality of points from rain, fog, or snow; and
evaluating the quality factor for the respective point based on spatial and temporal relationships distinguishes object points from the plurality of points from rain, fog, or snow.

3. The LiDAR system of claim 1 wherein the plurality of light pulses in each respective set of light pulses is separated from each other by unique time delays.

4. The LiDAR system of claim 1 wherein each set of light pulses of the plurality of sets of light pulses is emitted by the plurality of light sources in a same sequential order.

5. The LiDAR system of claim 1 wherein:
a first set of light pulses of the plurality of sets of light pulses is emitted by the plurality of light sources in a first sequential order; and
a second set of light pulses of the plurality of sets of light pulses is emitted by the plurality of light sources in a second sequential order that is different from the first sequential order.

6. The LiDAR system of claim 1 wherein analyzing the spatial and temporal relationships between the respective point and the neighboring points comprises:
for each respective neighboring point, evaluating a partial quality factor that is inversely proportional to a spatial and temporal separation between the respective point and the respective neighboring point; and
evaluating a sum of partial quality factor values of the neighboring points.

7. The LiDAR system of claim 6 wherein the spatial and temporal separation between the respective point and the respective neighboring point relates to an angular separation, a range separation, and a temporal separation.

8. A method of operating a LiDAR system, the method comprising:
emitting, using a plurality of light sources disposed as an array, a plurality of sets of light pulses to be directed toward a scene within a field of view of the LiDAR system, wherein each respective set of light pulses comprises a plurality of light pulses in a temporal sequence, each respective light pulse being emitted by a respective light source of the plurality of light sources;
detecting, using a plurality of detectors disposed as an array, a plurality of return light pulses, wherein each respective detector corresponds to a respective light source, and at least a subset of the plurality of return light pulses corresponds to the plurality of sets of light pulses that have been reflected off of one or more objects in the scene;
determining a time of flight for each respective return light pulse of the plurality of return light pulses;
obtaining a point cloud based on the times of flight of the plurality of return light pulses, the point cloud including a plurality of points representing one or more surfaces of the one or more objects, each respective point corresponding to a respective return light pulse; and
for each respective point in the point cloud:
analyzing spatial and temporal relationships between the respective point and neighboring points in the point cloud; and
evaluating a quality factor for the respective point based on the spatial and temporal relationships.

9. The method of claim 8 wherein:
the point cloud includes a plurality of points from rain, fog, or snow; and
evaluating the quality factor for the respective point based on spatial and temporal relationships distinguishes object points from the plurality of points from rain, fog, or snow.

10. The method of claim 8 wherein the plurality of light pulses in each respective set of light pulses is separated from each other by unique time delays.

11. The method of claim 8 wherein each set of light pulses of the plurality of sets of light pulses is emitted by the plurality of light sources in a same sequential order.

12. The method of claim 8 wherein:
a first set of light pulses of the plurality of sets of light pulses is emitted by the plurality of light sources in a first sequential order; and
a second set of light pulses of the plurality of sets of light pulses is emitted by the plurality of light sources in a second sequential order that is different from the first sequential order.

13. The method of claim 8 wherein analyzing the spatial and temporal relationships between the respective point and the neighboring points comprises:
for each respective neighboring point, evaluating a partial quality factor that is inversely proportional to a spatial and temporal separation between the respective point and the respective neighboring point; and
evaluating a sum of partial quality factor values of the neighboring points.

14. The method of claim 13 wherein the spatial and temporal separation between the respective point and the respective neighboring point relates to an angular separation, a range separation, and a temporal separation.

15. The LiDAR system of claim 3 wherein the unique time delays are randomized time delays.

16. The method of claim 10 wherein the unique time delays are randomized time delays.

17. A LiDAR system comprising:
a plurality of light sources disposed as an array and configured to emit a plurality of sets of light pulses to be directed toward a scene within a field of view of the LiDAR system, wherein each respective set of light pulses comprises a plurality of light pulses in a temporal sequence, each respective light pulse being emitted by a respective light source of the plurality of light sources;
a plurality of detectors disposed as an array, each respective detector corresponding to a rerspective light source, the plurality of detectors configured to detect a plurality of return light pulses, at least a subset of the plurality of return light pulses corresponding to the plurality of sets of light pulses that have been reflected off of one or more objects in the scene; and
a processor coupled to the plurality of light sources and the plurality of detectors, the processor configured to:
determine a time of flight for each respective return light pulse of the plurality of return light pulses;
obtain a point cloud based on the times of flight of the plurality of return light pulses, the point cloud including a plurality of points representing one or more surfaces of the one or more objects, and the point cloud including a plurality of points from rain, fog, or snow, each respective point corresponding to a respective return light pulse; and
for each respective point in the point cloud:
analyze spatial and temporal relationships between the respective point and neighboring points in the point cloud; and
evaluate a quality factor for the respective point based on the spatial and temporal relationships that distinguishes object poionts from the plurality of points from rain, for, or snow.

18. The LiDAR system of claim 17 wherein the plurality of light pulses in each respective set of light pulses is temporally separated from each other by unique time delays.

19. The LiDAR system of claim 18 wherein the unique time delays are randomized time delays.

20. The LiDAR system of claim 17 wherein:
a first set of light pulses of the plurality of sets of light pulses is emitted by the plurality of light sources in a first sequential order; and
a second set of light pulses of the plurality of sets of light pulses is emitted by the plurality of light sources in a second sequential order that is different from the first sequential order.

* * * * *